Nov. 17, 1953     E. N. BOSDET     2,659,667
APPARATUS FOR ECONOMIZING FUEL AND INCREASING
POWER OUTPUT OF INTERNAL-COMBUSTION ENGINES
Filed April 17, 1951

INVENTOR
ENRIQUE N. BOSDET

BY

ATTORNEY

Patented Nov. 17, 1953

2,659,667

UNITED STATES PATENT OFFICE 2,659,667

APPARATUS FOR ECONOMIZING FUEL AND INCREASING POWER OUTPUT OF INTERNAL-COMBUSTION ENGINES

Enrique N. Bosdet, Mexico City, Mexico

Application April 17, 1951, Serial No. 221,422
Claims priority, application Mexico
November 15, 1950

2 Claims. (Cl. 48—180)

1

The present invention relates, in general, to accessories for internal combustion engines, and especially to fuel-saving devices, and it relates more particularly to certain useful improvements in apparatus for economizing fuel and furnishing internal combustion engines with a greater power output.

The apparatus of my invention provides a new, efficient and useful combination of means which furnish an improved apparatus of the type indicated, while furnishing simultaneously a greater output from the fuel in internal combustion engines, which results in a considerable saving in fuel, the smoother and more rhythmic operation of said engines, and a greater power output for said engines, since a better mixture of the fuel and air is obtained.

Furthermore, the present apparatus may be adapted very easily to the internal combustion engines of automobiles or automotive vehicles, between the carburetor outlet and the intake pipe of the manifold, through which the explosive mixture enters the monoblock where the cylinders of the engine are located.

In accordance with the foregoing, it is the principal object of the invention to provide an apparatus for economizing gasoline, which is easily adaptable to automobile engines and the principal feature of which is the utilization of the gases given off by the gasoline in the automobile tank, in the carburetor mixture; together with means for effecting a better and more effective mixture.

Another object of the fuel saver of the invention is to provide an apparatus of the type indicated, having a filter for the air or gas suction from the intake tube of the gasoline tank, and a safety valve so that when false explosions or detonations occur, there is not the least possibility of their reaching the gasoline tank.

A further object of the invention is to furnish a fuel-saver, connected by means of an appropriate pipe, to the intake neck of the gasoline tank, in order to suction out through said pipe the gasified air issuing from the fuel contained in said tank.

Other objects, details, and features of the fuel-saving apparatus of my invention, will be apparent from the following description as also from the drawings attached as an illustration thereof, the same reference numbers being employed to indicate the same parts in the three figures shown.

Figure 1:
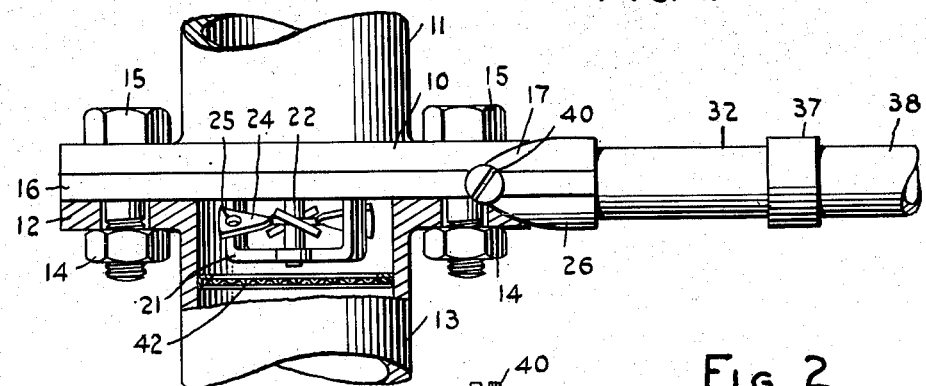

In said drawings:

Figure 1 shows a side elevation of the improved fuel saver of my invention, as adapted between the base flange of the carburetor and the flange on the inlet pipe of the manifold, i. e., held between said flanges; the upper end of the manifold and its flange being shown partially in vertical section, to illustrate the parts of the apparatus that are hidden.

Figure 2:
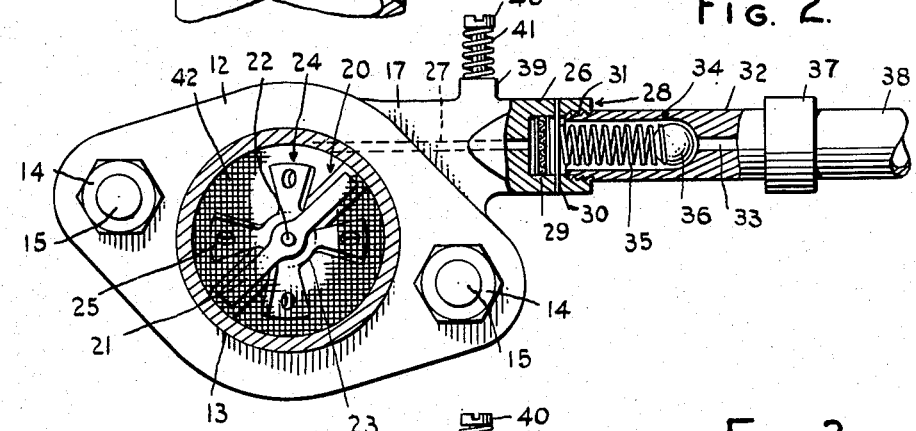
Figure 3:
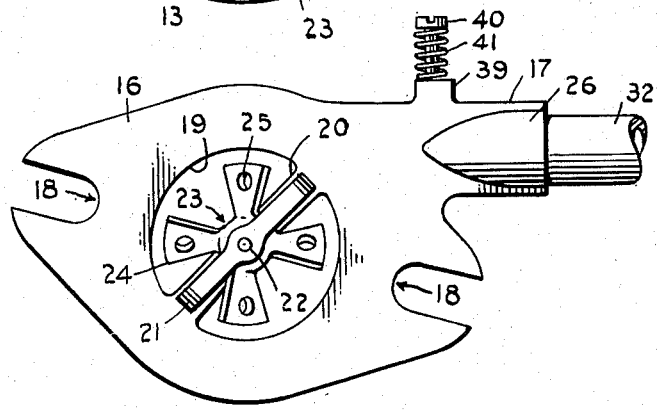

Figure 2 is a plan view taken from below, of the same apparatus illustrated in Figure 1, the intake nozzle being shown in longitudinal section in order to show the safety valve and the filter element at the entrance of the apparatus; and Figure 3 is also a plan view of the apparatus itself of my invention, that is, without its being adapted and secured between the base flange of the carburetor and the flange of the intake pipe of the manifold.

Before describing in detail the gasoline saving device of my invention, I wish it to be understood that the drawings illustrate solely by way of example the preferred form of practicing the invention, without the latter being limited to specific details described herein and illustrated in the attached drawings. Recourse may be had, therefore, to such variations or modifications as become necessary in practice, without departing from the principles and scope of the invention and without further limitation than that set forth in the appended claims.

As is illustrated in the attached drawings, between the flange 10 of base 11 of the carburetor of the automobile engine to which the apparatus described is adapted, and flange 12 of the intake pipe of the manifold 13, there is secured, by means of screws or nuts 14 and bolts 15, said apparatus, which is formed by plate 16, having generally the same form as flanges 10 and 12, as is best shown in Figs. 2 and 3 of the attached drawings, except that it has, near one of its ends, an extension or prolongation 17.

At its opposite ends, plate 16 has cut-out portions 18, which register exactly with the respective openings in flanges 10 and 12, for the admission of threaded bolts 15, and it also has a central opening or bore, 19, coinciding with that of the tubular base of carburetor 11 and the manifold pipe 13. Said central opening or bore 19 is traversed diametrically by a bridge 20, under which there is riveted a small U-shaped beam 21 (Fig. 1 of the drawings), to allow of placing between the latter and bridge 20 the fixed shaft 22, disposed at the center of the bridge or crosspiece 20 and that of the U-shaped beam 21. The propeller 23 revolves on said axle or shaft 22, said propeller having two, three, four or more blades 24 and revolving easily, centered precisely at bore 19, between the crosspiece 20 and the bent beam 21. The suction produced when the engine is started, causes said propeller 23 to rotate at high speed.

Each of the blades 24 of propeller 23 has a perforation or bore 25, which improves still more the atomization and mixture of the fuel with the air.

Extension 17 of plate 16, which constitutes the body of the apparatus of the invention, ends in a nozzle 26 and has a longitudinal bore 27 (Fig. 2 of the drawings) which connects through plate 16, end 28 of said extension 17, to the peripheral edge of the central opening or bore 19. Longitudinal bore 27 is appreciably flared at nozzle 26, in which extension 17 of plate 16 ends, said plate constituting the body of the apparatus; and in said flared portion is lodged filter disc 29 (Fig. 2 of the attached drawings), made of very fine screening. In order to secure and maintain in position said air filter 29, said nozzle 28 has a central bolt or crosspiece 30, also clearly illustrated in Fig. 2 of the said attached drawings.

The enlarged bore of nozzle 26 has at its end 28 threads 31 to receive the threaded end of a small pipe 32, which constitutes the safety valve of the device. Said pipe 32 has a longitudinal bore 33, considerably flared toward its threaded end, as shown at 34, in which enlarged bore portion 34 is lodged a two-way pressure spring, which exerts pressure on one side against the crosspiece 30 and on the other against the sphere or ball 36, lodged against the hemispheric end of flared opening 34 and connecting with duct 33.

The small pipe 32 connects, through coupling 37, with pipe 38 which, starting from said coupling, connects with the gasoline tank (not shown) at the neck constituting the feed duct or inlet of said tank. Inasmuch as in the upper part of said tank or at least in said neck there is air and gases emanated by the gasoline, said air and gases are suctioned up through said pipe 38, safety valve 32, nozzle 26 and duct 27, to enrich the carburetor mixture.

In a small stem 39 of extension 17, having a threaded bore connecting perpendicularly with duct 27, there is lodged screw 40 which functions as a spray to regulate the entrance of air and gases to the interior of the device, through duct 27. A spring 41, adapted to the body of screw 40, permits of adjusting said spray more precisely.

Acting as a filter disposed in the pipe of manifold 13, in its upper part near flange 12, there is a screen disc 42, which prevents the passage of waste, dust, etc., to said entrance pipe 13 to the manifold.

*Operation of apparatus*

When the automobile engine to which the fuel-saving device of the invention has been adapted, is started, a strong suction is created, capable of bearing an appropriate amount of mixture of gasified fuel and air to the cylinders. Said suction causes propeller 23, with perforated blades 24, to rotate rapidly, said blades acting to effect a better mixture enriched with the gases emanating from the gasoline in the tank (not shown), since, as already stated, the device is connected to said tank by means of pipe 38. The air and gases arriving through pipe 38 and passing through safety valve 32 and duct 27, also accelerate the rotation of said propeller 23.

The entrance of air and gases is conveniently regulated by spray 40. If detonations or false explosions should occur, in order that there may not be the slightest possibility of their reaching the gasoline tank, the safety valve 32 acts efficiently, closing duct 33 by means of ball 36, against which the two-way pressure spring 35 acts; while as long as the engine operates normally, the suction slightly displaces said sphere from its seat, permitting the passage of the air and gases coming from the upper part of the gasoline tank. For this purpose the force exerted by two-way pressure spring 35 must, of course, be correctly calculated.

Having thus described the invention, what I consider as new and desire to secure by Letters Patent is:

1. A gas mixer, comprising a flat body adapted to be disposed between a carburetor and a manifold, the body having a central opening, a fan supported on the flat body portion in line with the opening and actuated by suction through said manifold to atomize fuel therein, a passage formed in the flat plate tangentially and communicating with the central opening, a pipe communicating at one end with the passage and adapted to communicate at its opposite end with a gas tank above the level of the gas therein to admit gasified air from the tank to mix with the gaseous mixture drawn from the carburetor in advance of the fan, and an automatically operated one way valve to open the pipe under suction from the manifold and to close the pipe when the fan is at rest.

2. A gas mixer, as defined in claim 1, wherein the fan blades are provided with openings to break up the gas passing through the central opening.

ENRIQUE N. BOSDET.

References Cited in the file of this patent

UNITED STATES PATENTS

| Number | Name | Date |
|---|---|---|
| 1,259,266 | Moseley | Mar. 12, 1918 |
| 1,498,859 | Wekerle | June 24, 1924 |
| 1,849,563 | Woodhull | Mar. 15, 1932 |
| 2,004,919 | Alvey et al. | June 18, 1935 |